United States Patent [19]

Wilcock et al.

[11] Patent Number: 4,527,802
[45] Date of Patent: Jul. 9, 1985

[54] INTEGRAL MAGNETIC FLUID CENTRIFUGAL HIGH SPEED GAS SEAL AND METHOD

[75] Inventors: Donald F. Wilcock; Stanley Gray, both of Schenectady, N.Y.

[73] Assignee: Mechanical Technology Incorporated, Latham, N.Y.

[21] Appl. No.: 477,502

[22] Filed: Mar. 21, 1983

[51] Int. Cl.³ .......................... F16J 15/42; F16J 15/56
[52] U.S. Cl. .......................................... 277/1; 277/25; 277/80; 308/10
[58] Field of Search ....................... 308/10; 277/25, 80, 277/13, 14 R

[56] References Cited

U.S. PATENT DOCUMENTS

| | | | |
|---|---|---|---|
| 2,863,538 | 12/1958 | Jaeschke | 192/21.5 |
| 3,612,630 | 10/1971 | Rosensweig | 308/10 |
| 3,620,584 | 11/1971 | Rosensweig | 308/187.1 |
| 3,694,042 | 9/1972 | Rabenhors | 308/26.3 |
| 3,734,578 | 5/1973 | Rosensweig | 308/10 |
| 3,746,407 | 7/1973 | Stiles et al. | 308/36.3 |
| 4,200,296 | 4/1980 | Stahl et al. | 277/80 |
| 4,304,411 | 12/1981 | Wilcock | 277/25 |
| 4,335,885 | 6/1982 | Heshmat | 277/25 |

*Primary Examiner*—Robert I. Smith

*Attorney, Agent, or Firm*—Joseph V. Claeys; Arthur N. Trausch, III; Charles W. Helzer

[57] ABSTRACT

A magnetic/centrifugal-fluid seal is characterized by a common region serving as both the magnetic gap for the magnetic seal and a fluid-receiving pool for the centrifugal seal. A magnetically permeable annular rotating member extends radially into an annular space defined by a magnetically permeable stationary member to form an annular space of U-shaped cross-section between the members. A closed magnetic circuit is established through the members and the space, which space thereby acts as a magnetic gap to retain the fluid therein when the rotating member is at rest or rotated at low speeds. The common region also retains the fluid when it is centrifugally pressurized during high speed rotation of the rotating member. The fluid remains substantially in the same location during speed-up and slow-down, thereby avoiding compromise of the seal during speed transitions. Recirculation and replacement of the fluid is achieved in conjunction with an injection port arranged to deliver fluid to the common region through the stationary member. A fluid reservoir includes a sight glass to permit viewing the fluid condition and level and is arranged to selectively deliver fluid to the inlet port by gravity feed. A pump in the recirculation path delivers recirculating fluid to the reservoir from a vent on the low pressure side of the seal.

20 Claims, 2 Drawing Figures

INTEGRAL MAGNETIC FLUID CENTRIFUGAL HIGH SPEED GAS SEAL AND METHOD

BACKGROUND OF THE INVENTION

1. Field of Invention

This invention relates to a combined magnetic/centrifugal-fluid seal for hermetically sealing a rotatable shaft supported in a closely-fitted housing in a non-contacting, non-wearing manner.

More particularly, the invention relates to a hermetic seal that comprises a combined magnetic seal employing a ferrofluid for hermetically sealing a rotatable shaft in the zero and low speed range and which utilizes the ferrofluid to form a centrifugal fluid seal at higher shaft speeds.

2. Background Problem

There are many applications, such as pumps, compressors and the like, where hermetic sealing of a rotatable shaft in a non-contacting, non-wearing manner is not only desirable but essential during both zero or low speed operation and during high speed rotation. Because of the sealing requirement in high speed applications, and in order to reduce wear, it is desirable that the seal be non-contacting in nature.

One well known form of non-contacting seal for use at zero and low speeds is the magnetic ferrofluid seals of the type described in U.S. Pat. No. 2,863,538—issued Dec. 9, 1958 for a "Permanent Magnet Seal"; U.S. Pat. No. 3,746,407—issued July 17, 1973 for a "Ferro Hydrodynamic Low Friction Bearing"; and an article entitled "Magnetic-Fluid Seal" appearing in Machine Design magazine, Mar. 28, 1968 issue, pages 145–150, for example. While known designs of ferrofluid seals can operate satisfactorily at zero speed and low speeds, as in a vacuum chamber feed-through, they tend to break down and leak at high rotational speeds.

A known form of non-contacting seal which can operate satisfactorily at high rotational speeds is the centrifugal seal of the type described in U.S. Pat. No. 3,694,042—issued Sept.26, 1972 for a "Radial Fluid Bearing", for example. Such known centrifugal seals can support a large pressure difference based on the level difference of a pool of fluid formed on the two sides of a rotating disc or ring attached to a shaft. The pool of fluid is both formed and maintained by centrifugal force effects. However, centrifugal seals have little capacity at low rotational speeds and collapse and leak at standstill.

The seals described and illustrated in U.S. Pat. Nos. 4,304,411 (Wilcock et al) and 4,200,296 (Stahl et al) were developed to overcome the aforementioned deficiencies of the magnetic seal at high speed operation and the centrifugal seal at low speed operation. The disclosures in both of these patents in their entirities are expressly incorporated herein by reference. Both of these patents disclose seal arrangements having separate centrifugal and magnetic seal sections of the type described individually above. During high speed operation a centrifugal sealing mode is established whereby magnetically permeable fluid (i.e. ferrofluid) is thrown radially outward by centrifugal force into the centrifugal seal section. The same ferrofluid returns to the magnetic seal section to effect a magnetic seal mode as the operating speed decreases. Sealing at both high speed and low or zero speed is quite effective in both the Wilcock et al and Stahl et al seals. However, some leakage of gas across the seal can occur during transition between sealing modes as the fluid moves from one section to the other.

Another prior art seal also employs separate magnetic and centrifugal seals but utilizes different fluids for each seal. Specifically, during high speed operation the magnetically permeable fluid is thrown by centrifugal force into a toroidal holding tank while a separate fluid, generally an oil, is thrown into the centrifugal seal section. As is the case with the Wilcock et al and the Stahl et al seals, leakage of gas across the seal can occur during transitions between high and low speeds.

SUMMARY OF THE INVENTION

It is therefore a primary object of the present invention to provide a novel combined magnetic/centrifugal-fluid seal which prevents leakage through the seal during transitions between sealing modes.

It is another object of the present invention to provide such a seal for hermetically sealing a rotatable shaft in a housing in a non-contacting, non-wearing manner and wherein leakage across the seal is prevented during shaft speed transitions.

Still another object of the present invention is to provide a combined magnetic/centrifugal-fluid seal which eliminates the requirement for magnetically permeable fluid to move between different seal locations during operating speed transitions of the type which produce sealing mode transitions.

In one manner of practicing the present invention a common region is employed to establish a magnetic gap during low or zero speed operation and to retain the centrifugally-pressurized fluid during high speed operation. The common region is annular with a U-shaped cross-section formed between the annular rotating member and a stationary member having an annular aperture in which the rotating member rotates. At low speed operation of the rotating member a closed magnetic circuit is established through the rotating and stationary members and the magnetically permeable fluid disposed in the common region gap. The magnetically permeable fluid is magnetically retained in the gap by the magnetic circuit flux and seals the common region to prevent gas leakage axially along the rotating member. During high speed operation the magnetically permeable fluid is retained in the common region by centrifugal forces and continues to seal the common region. Since the ferrofluid remains in a common region during transitions between operating speeds and between sealing modes, the seal remains intact during these transitions.

In the preferred embodiment, the rotating member is a magnetically permeable ring which projects radially outward between two magnetically permeable, axially-spaced annular side plates. A permanent magnetic ring is disposed between the side plates in concentric spaced relation with the rotating ring. A non-permeable ring is disposed concentrically between the magnet and rotating ring in abutting relation with the magnet and spaced from the rotating ring. The space between the rotating ring and each of the side plates and the non-permeable ring defines the common region which serves as the magnetic gap and the centrifugal seal fluid collecting region.

An injection port is defined through the stationary member on the high pressure side of the seal to permit make-up fluid to be added to the sealing ferrofluid or to permit complete change of the ferrofluid. Excess ferrofluid is vented via a conical clearance space, emanating from the common region, to a drain or vent port. A recirculation path for the fluid includes a reservoir, a pump and a valve to permit the fluid to be recirculated. The centrifugal pressure on the fluid may be used instead of or to assist the pump in forcing ferrofluid from the seal region. The reservoir is positioned at a height above the injection port to permit gravity feed of the stored fluid.

A second embodiment of the invention is disclosed wherein two identical side-by-side seals are formed using a common side plate for both seals.

BRIEF DESCRIPTION OF THE DRAWINGS

These and other objects, features and many of the attendant advantages of the invention will be better understood upon a reading of the following detailed description when considered in connection with the accompanying drawings wherein like parts in each of the several figures are identified by the same reference number and wherein.

DETAILED DESCRIPTION OF DRAWINGS

Figure 1:
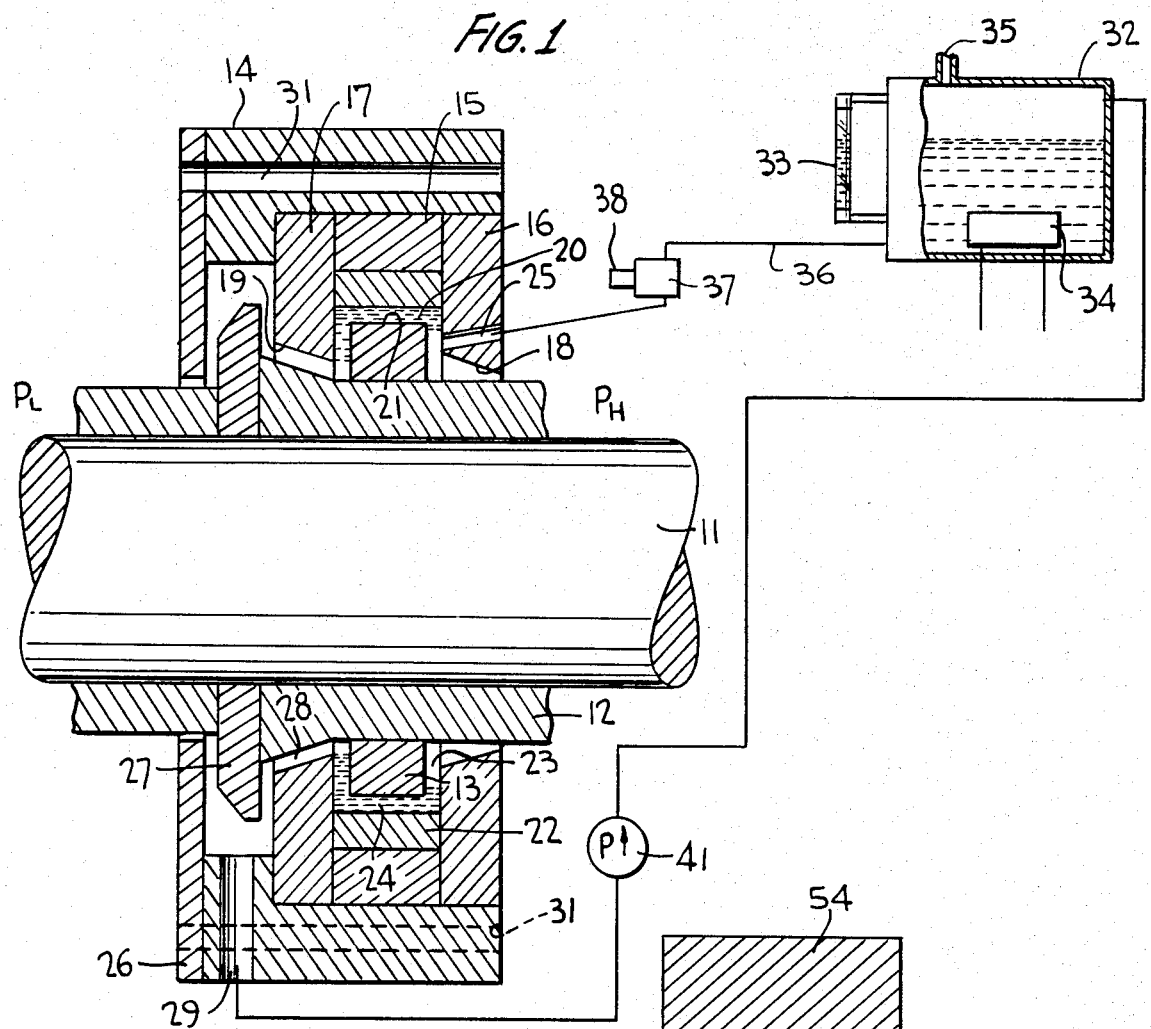
FIG. 1 is a view in partial section of a novel magnetic/centrifugal-fluid seal constructed according to the present invention.

FIG. 1 is a view in partial section of a preferred embodiment of the combined magnetic/centrifugal-fluid seal of the present invention. Referring specifically to FIG. 1, a rotatable shaft 11 has a magnetically non-permeable sleeve 12 disposed concentrically about at least a portion of its length. Sleeve 12 is press-fit, brazed, welded or otherwise secured to shaft 11 so that the sleeve rotates in synchronism with the shaft. A steel or otherwise magnetically permeable ring 13 is disposed concentrically about a short length of sleeve 12. Ring 13 is likewise press-fit, brazed or otherwise secured to sleeve 12 so that the ring rotates in synchronism with both sleeve 12 and shaft 11. The seal of the present invention provides pressure isolation between axial locations along shaft 11 on opposite sides of rotating ring 13. As illustrated in FIG. 1, the two isolated pressure regions are designated $P_L$ (for low pressure) and $P_H$ (for high pressure).

Rotatable shaft 11 is journaled in a bearing (not shown) that is supported in a stationary annular housing 14 made of magnetically non-permeable material. A stationary permanent magnet, in the form of a ring or annulus 15, is secured to housing 14 in radially spaced concentric relation about rotating ring 13. A pair of stationary annular side plates 16 and 17, made of magnetically permeable material, are also mounted in housing 14 on opposite axial sides of ring magnet 15. The mutually facing surfaces of side plates 16 and 17 are in close contact with the respective presented surfaces of ring magnet 15 to provide a continuous path for magnetic flux between the end plates through the ring magnet. The inner annular surfaces 18 and 19 of end plates 16 and 17, respectively, project radially inward toward shaft 11 beyond the outer surface 21 of rotating ring 13 to be closely radially spaced-apart from sleeve 12. The axial spacing between side plates 16 and 17 is slightly greater than the axial length of rotating ring 13 so that each axially-facing surface of ring 13 is closely spaced-apart from a respective side plate 16, 17. A non-magnetic (i.e. made of magnetically non-permeable material) annular member 22 is secured at its outer surface to the inner surface of ring magnet 15, and along its axially-facing surfaces to the respective side plates 16 and 17. The radially inner surface of non-magnetic member 20 is radially closely spaced-apart from the outer surface of rotating ring 13. The radial spacing of rotating ring 13 from non-magnetic member 22 and the axial spacing of rotating ring 13 from side plates 16 and 17, establishes an annular magnetic gap 23 having a generally U-shaped cross-section taken along the axis of rotation of shaft 11. A magnetic field is established by permanent magnet 15 through stationary side plates 16 and 17 and rotating ring 13 across the close-clearance annular, magnetic gap 23. A magnetically permeable ferrofluid 24 is disposed in gap 23. With shaft 11 at rest or rotating at low rotational speeds, the magnetically permeable ferrofluid, shown at 24, is attracted to and retained within the annular gap 23.

Ferrofluid 24 may comprise any known commercially available ferrofluid and is composed of a carrier liquid with a ferric suspension; however, other fluids such as hydrocarbons may also be used. The important considerations with respect to the ferrofluid are its saturation magnetization and its viscosity. The stronger the saturation magnetization characteristics of the ferrofluid are, the greater is the pressure drop that can be accommodated by a magnetic seal formed with the ferrofluid. The viscosity of the ferrofluid should be as low as practical so as to minimize viscous power loss during high speed rotation of shaft 11. A typical ferrofluid suitable for use in the present seal was measured to have a saturation magnetization of 250–300 Gauss and a viscosity of 0.06–0.10 pa-second (60–100 cps) at room temperature (magnetized) and a measured density of 996.5 k/M$^3$ (0.036 lbs/inch$^3$). The other important property of the ferrofluid is the requirement that it be immiscible with regard to the fluids being sealed in or out relative to the low pressure region $P_L$ and the high pressure region $P_H$.

The inner annular surfaces 18, 19 of side plates 16, 17, respectively, are axially tapered such that their edges closest to the high pressure side $P_H$ of the seal are closer to the axis of shaft 11 than their edges closest to the low pressure side $P_L$ of the seal. The non-magnetic sleeve 12 is similarly axially tapered opposite surface 19 of low pressure side plate 17 to provide a narrow slot 28 of uniform annular width between plate 17 and the sleeve. There is no similar taper in the portion of sleeve 12 which faces surface 18 of high pressure side plate 16. One or more inlet or injection ports 25 are defined through high pressure side plate 16 to admit make up or replacement ferrofluid into gap 23 in the space between rotating ring 13 and the high pressure side plate 16. A non-magnetic frame end plate 26 has an annular configuration and has its radially-inner surface disposed in closely-spaced apart proximity to sleeve 12 on the low pressure side of the seal. End plate 26 is axially spaced from low pressure side plate 17 to define an annular space between plates 17 and 26 about sleeve 12. A non-magnetic slinger member 27 extends radially outward from sleeve 12 into the annular space between plates 17 and 26. Slinger member 27 serves to prevent leakage of the ferrofluid to the low pressure side of the seal rather than through a vent passage 29 which is present for that purpose. Vent passage 29 extends radially through housing 14 from the space between plates 17 and 26 on the low pressure side of the seal. Ferrofluid 24 can thus be delivered to the gap 23 at the high pressure side of the seal through injection port 25 and removed from the gap at the low pressure side of the seal via vent or bleed passage 29. A plurality of annular axially-extending coolant flow passages 31 extend through housing 14 and end plate 26 to permit cooling of the housing and the seal components when shaft 11 is rotated as shown in the upper part of FIG. 1 and in dotted outline at the bottom of FIG. 1. The cooling fluid may be air, oil, or other conventional coolant fluid.

During operation at low speeds, or at standstill, the magnetic fluid 24 is retained by the closed magnetic circuit within the close clearance magnetic gap region 23 defined between rotating ring 13, on the one side, and side plate 16, 17 and non magnetic ring 22, on the other side. The energizing force for the magnetic circuit is the permanent magnet 15; however, a selectively energizable electromagnet may be used in place of a permanent magnet. The magnetic fluid in gap 23 forms a magnetic pressure seal between the low pressure region $P_L$ and high pressure region $P_H$ axially along shaft 11. The pressure drop between these two regions is withstood by virtue of the axially and radially directed magnetic attraction of the ferrofluid to the opposite sides of gap 23, thereby effecting a seal. As the shaft rotational speed increases, the fluid is forced radially outward by centrifugal force but is retained in gap 23. Specifically, whereas the magnetic force retaining the ferrofluid 24 in gap 23 at low speed operation is both axially and radially directed, the centrifugal force at high speed operation is only radially directed. This tends to force the ferrofluid, at high speed, toward the non-magnetic ring 13, thereby retaining the fluid in gap 23 to maintain the integrity of the seal between the high and low pressure regions. Gap 23 thus serves as a common region for containing the sealing ferrofluid during both the magnetic and centrifugal sealing modes. Importantly, the fluid also remains in gap 23 and maintains the seal integrity during transitions from low to high shaft rotation speed and vice versa. The disadvantage of leakage during transition, which is present in prior art magnetic/centrifugal-fluid seals, is thereby avoided.

In designing a combined magnetic/centrifugal-fluid seal according to the invention, a small clearance between moving and stationary parts is desirable in order to optimize magnetic sealing characteristics of the magnetic operating mode of the seal. The magnitude of the clearances, however, depends upon other factors which include shaft run out, and radial strain due to centrifugal and thermal growth. The common gap region 23 is designed to contain the magnetic fluid during both sealing modes.

For practical applications of the magnetic/centrifugal-fluid seal, permanent magnets generally would be used in the manner shown in FIG. 1, or in other comparable configurations employing permanent magnets. Theoretically, the magnetic seal strength during the magnetic operating mode is proportional to the magnetic field intensity up to the point where the ferrofluid saturation level is reached. Consequently, the strongest permanent magnet available may be employed in such applications in order to conserve space and radial dimension. Rare earth-cobalt or Samarium-cobalt materials provide the strongest man-made permanent magnets with residual flux densities on the order of 7,300 to 8,500 Gauss. However, for other applications, it may prove more desirable to employ less expensive materials or even an electromagnet for the magnetic seal mode.

Theoretically, the seal strength or capacity, P, of a single magnetic seal stage is proportional to the magnetic field intensity as follows:

$$\Delta P = (M_s)(H)(10^{31\ 6})/4 \text{ atmospheres} \tag{1}$$

where $M_s$ is the magnetization saturation of the magnetic fluid in gauss, and H is the gap magnetic field intensity measured in Oerstends when the magnetic fluid is magnetized to saturation. Using equation (1) and based on actual measured flux density in a single magnetic seal stage, it was determined that the sealing capacity of a single magnetic seal was approximately 4.0 psi. Additional sealing stages, such as described more fully hereinafter with respect to FIG. 2, can increase the sealing capacity.

The sealing capacity during the centrifugal seal mode has been calculated using the equation:

$$\Delta P = \frac{\rho \omega^2}{8}(r_o^2 - r_1^2) \tag{2}$$

where $r_0$ is the fluid level on the low pressure side, $r_1$ is the fluid level on the high pressure side, $\rho$ is the density of the fluid and $\omega$ is the shaft speed.

A ferromagnetic fluid recirculation path is illustrated diagrammatically in FIG. 1. Specifically, a reservoir 32 stores ferrofluid and is positioned at a height above the common sealing region or gap 23 to permit gravity feed of ferrofluid to the gap. The reservoir includes a vertically-extending sight glass 33 connected in flow communication with the reservoir interior to permit external viewing of the level and condition of the stored ferrofluid. A heater/cooler unit 34 permits the temperature of the ferrofluid in the reservoir to be controlled. Reservoir 32 is vented at 35 and has a fluid egress line 36 which flows stored fluid downward toward ejection port 25. A drip feeder unit 37 is disposed in line 36 and is selectively energized and de-energized by solenoid valve 38. Ferrofluid which is vented from bleed passage 29 can be returned to the reservoir by means of a pump 41. Alternatively or additionally to pump 41, the centrifugal force exerted on any ferrofluid which overflows gap 23 through passage 28 at the low pressure side of the seal may be used to return that fluid to the reservoir 32. The re-circulation path may be used to continuously or periodically recirculate the ferrofluid and/or to replace ferrofluid as necessary in accordance with whether drip feeder 37 is continuously or selectively activated, respectively, by solenoid 38. Egress of the ferrofluid 24 from the seal through the bleed passage 29 is aided by slinger member 27 which blocks flow of the fluid out through the space between end plate 26 and sleeve 12. More specifically, outflow through slot 28 is axially impeded by slinger member 27 so that the centrifugal pressure or the suction from pump 41 can direct all of the egressing fluid radially outward to bleed passage 29.

Figure 2:
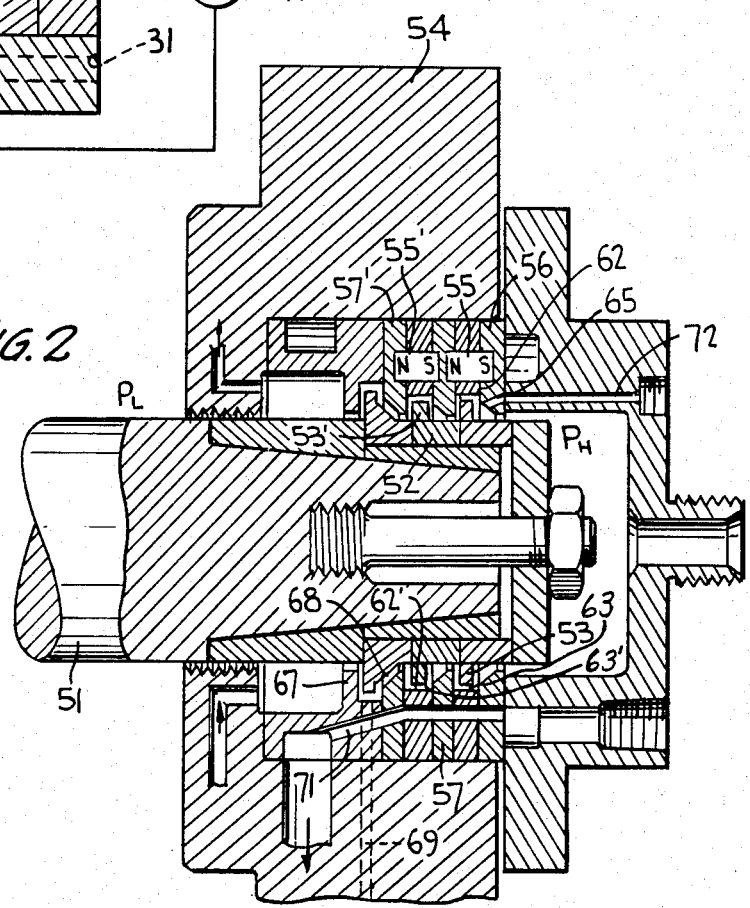
FIG. 2 is a view in partial section of another form of combined magnetic/centrifugal-fluid seal according to the invention and employing two side-by-side seals.

Reference is now made to FIG. 2 of the accompanying drawings wherein a magnetic/centrifugal-fluid seal of the present invention includes two serially positioned or cascaded seals of the type described in relation to FIG. 1. A rotatable shaft 51 has a magnetically non-permeable sleeve 52 disposed about at least a portion of its length. Sleeve 52 is brazed, welded, press-fit or otherwise secured to shaft 51 so that the sleeve rotates with the shaft. A steel or otherwise magnetically-permeable ring 53 is disposed concentrically about a short axially-extending portion of shaft 51. A similar ring 53' is disposed concentrically about another short axially-extending portion of the shaft in axially spaced relation to ring 53. Rings 53 and 53' are press-fit, brazed, welded or otherwise secured to sleeve 52 so that rings 53, 53' rotate with sleeve 52 in synchronism with shaft 51. The seal of the embodiment of FIG. 2 provides pressure isolation along shaft 51 across the two cascaded seals established, in part, by rotating rings 53 and 53'. As illustrated in FIG. 2, the two mutually isolated pressure regions are designated $P_L$ and $P_H$ as in FIG. 1.

Rotatable shaft 51 is journaled in a bearing which is supported in a stationary housing (not shown) and in a bearing housing 54 made of magnetically non-permeable material. Two axially-spaced, annularly-extending rows of permanent magnets 55, 55' serve as the source of magnetization for the two magnetic seals. Alternatively, instead of an annular row of individual magnets, permanent magnets 55, 55' may each correspond to an annular magnet such as magnet 15 of the embodiment illustrated in FIG. 1. Magnets 55, 55' are secured to stationary housing 54 in radially-spaced concentric relation with respective rotating rings 53, 53'. A first pair of annular side plates 56, 57, made of magnetically permeable material, is mounted in housing 54 on opposite axial sides of magnet 55. The mutually facing surfaces of side plates 56, 57 are in close contact with respective presented surfaces of magnet 55 to provide a continuous path for magnetic flux between end plates 56 and 57 through magnet 55. The inner annular surfaces of end plates 56 and 57 project radially inward toward shaft 51 beyond the outer surface of rotating ring 53 to be closely spaced-apart from sleeve 52. The axial spacing between side plates 56 and 57 across rotating ring 53 is slightly greater than the axial length of ring 53 so that each axially facing surface of ring 53 is closely spaced-apart from respective side plates 56, 57. A non-magnetic annular member 62 is secured at its radially outer surface to the radially inner surface of magnet 55, and along its axially facing surfaces to respective side plates 56, 57. The radially inner surface of non-magnetic annular member 62 is closely spaced-apart from the radially outer surface of rotating ring 53. The radial spacing of rotating ring 53 from non-magnetic member 62, and the axial spacing of ring 53 from side plates 56 and 57, establish an annular magnetic gap 63 having a generally U-shaped cross-section taken along the axis of rotation of shaft 51. A magnetic field is established by stationary magnet 55 through stationary side plates 56 and 57 and rotating ring 53 across the close-clearance magnetic gap 63. With shaft 51 at rest, or rotating at low rotational speeds, a magnetically permeable ferrofluid is attracted to and retained in the annular magnetic gap 63.

The second seal is established with rotating ring 53', stationary magnet 55', non-magnetic annular member 62' and two annular side plates 57 and 57', all mutually oriented and operative in the manner described above in relation to ring 53, magnet 55, non-magnetic annular member 62 and side plates 56 and 57, respectively. In this regard it should be noted that side plate 57 is shared by both seals.

The inner annular surfaces of side plates 56, 57 and 57' are axially tapered such that their edges closest to the high pressure side $P_H$ of the seal are closer to the axis of shaft 51 than their edges closest to the low pressure side $P_L$. The non-magnetic sleeve 52 is similarly axially tapered opposite the radially inner edge of side plate 57' but not side plates 56 or 57. This mutually facing taper configuration provides an outlet slot 68 for the cascaded seals. Outlet slot 68 has a substantially uniform annular width between plate 57' and sleeve 52.

One or more inlet ports 65 are defined through the high pressure side plate 56 of the cascaded seal to admit make up ferrofluid into gaps 63, 63' in the space between rotating ring 53 and high pressure side plate 56. A fluid path exists between the gaps 63, 63' through the annular space defined between sleeve 52 and the common or middle side plate 57 so that fluid which overflows gap 63 flows into gap 63'. In turn, fluid overflow from gap 63' flows out of the seal arrangement through a bleed path 69 extending radially through housing 54 on the low pressure side of the seal. A slinger member 67 is provided at the low pressure side of the seal to serve the same function as slinger member 27 in FIG. 1. Ferrofluid can be delivered to the two cascaded seals through an inlet passage 72 defined through a hub on the bearing housing 54 to communicate with injection port 65. The fluid can be drained via bleed passage 69. Ferrofluid delivery and bleeding can be done manually, on a periodic maintenance schedule basis, or with a recirculating system of the type described in relation to FIG. 1.

An annular, radially-extending coolant flow passageway means, 71 extends through bearing housing 54 to permit cooling of the seal with coolant fluid. The coolant fluid may be recirculated through a reservoir in which the returned fluid is cooled before flowing back through passage 71.

During operation at low speeds, or at standstill, the magnetic fluid is retained by the closed magnetic circuit within the close clearance magnetic gap region 63, 63' defined between rotating ring 53, 53' on the one side and the side plates 56, 57, 57' and non-magnetic rings 62, 62' on the other side. The energizing force for the magnetic circuit is derived from the permanent magnets 55, 55'. The magnetic fluid in gaps 63, 63' forms a magnetic pressure seal between the low pressure region $P_L$ and high pressure region $P_H$ axially along the shaft 51. The two cascaded seals withstand the pressure drop by virtue of the axially and radially directed magnetic attraction of the ferrofluid to the opposite sides of the gaps 63, 63', thereby effecting the seal. As the shaft rotational speed increases, the fluid is forced radially outward by centrifugal force but is retained in the gaps 63, 63'. The fluid thus remains in the gaps 63, 63' during speed transitions so that the seal integrity is maintained during these transitions. By placing two or more seals in cascade or serial relationship along the shaft, the effect of the seal is multiplied.

It is particularly important to note that the speed-up and slow-down transitions between the two sealing modes occur with virtually no movement of the ferrofluid from the common region 23 (FIG. 1) and 63, 63' (FIG. 2). The only movement of the ferrofluid is a shift in the interface radius of the fluid and the outside atmosphere. As a result, no gas leakage occurs in either the speed-up or slow-down transitions.

From the foregoing description it will be appreciated that the invention makes available a novel combined magnetic/centrifugal-fluid seal for hermetically sealing a rotatable shaft in a housing wherein the sealing fluid is contained in a common region during both the magnetic sealing mode and the centrifugal sealing mode as well as during transitions between the sealing modes. Sealing is in a non-contacting, non-wearing manner. The hermetic seal thus provided is relatively simple in construction, inexpensive to operate and reliable in operation over a wide range of rotational speeds from 0 to in excess of 50,000 revolutions per minute. Since the seal is non-contacting, there is no rubbing of parts and hence no wear even at high rotational speeds for extended periods of time.

Having described several embodiments of a new and improved magnetic/centrifugal-fluid seal constructed according to the present invention, it is believed that other modifications, variations and changes will be suggested to those skilled in the art in the light of the above teachings. It is therefore to be understood that all such variations, modifications and changes are believed to come within the scope of the present invention as defined by the appended claims.

What is claimed is:

1. A magnetic/centrifugal-fluid seal for hermetically sealing the space between a rotating member and a close fitting spaced-apart stationary member comprising means formed on said members defining at least one common sealing region filled with a magnetically permeable fluid between opposed surfaces of the members, said common sealing region comprising both a magnetic pole-like close clearance gap region and a circumferentially arranged centrifugal seal forming region, said magnetically permeable fluid normally disposed in and filling said common sealing region with said rotating member at rest and rotating at slow rotational speeds, magnetic field producing means magnetically coupled to at least portions of said rotating and stationary members and said common sealing region and said magnetically permeable fluid in a closed magnetic circuit to form a magnetic seal in said common sealing region at slow and zero speeds of said rotating member, and said magnetically permeable fluid retained in and centrifugally pressurized in said common sealing region during high speed rotation of said rotating member to thereby form a centrifugal hermetic seal through the medium of the fluid pooled between the two members by centrifugal force, whereby there is no appreciable movement of said magnetically permeable fluid in said common sealing region during increasing and decreasing speed transitions of said rotating member and hermetic sealing is maintained.

2. A magnetic/centrifugal-fluid seal according to claim 1 wherein said common sealing region is an annular magnetic gap of generally U-shaped cross-section defined between said rotating and stationary members.

3. A magnetic/centrifugal-fluid seal according to claim 1 wherein said rotating member includes a magnetically permeable portion having a generally radially outward-facing surface and a pair of generally axially opposed surfaces partially defining the sides of said gap region, and wherein the other side of said gap region is formed by a generally radially inward-facing surface of said stationary member spaced radially from the radially outward-facing surface of said rotating member and by a pair of axially-facing surfaces of magnetically permeable portions of said stationary member which face said pair of axially-opposed surfaces, respectively.

4. A magnetic/centrifugal-fluid seal according to claim 3 wherein said radially inward-facing surface is a surface of a magnetically non-permeable annular member disposed axially between and in contact with said pair of axially-facing surfaces of said stationary member and disposed radially in spaced concentric relation about the magnetically permeable ring portion of said rotating member.

5. A magnetic/centrifugal-fluid seal according to claim 4 wherein said stationary member further comprises annular magnet means disposed in concentric abutting relation about said non-permeable annular member with the axial ends thereof disposed between and engaging the magnetically permeable portions of said stationary member which forms the pair of axially-facing surfaces that define the other side of the gap region.

6. A magnetic/centrifugal-fluid seal according to claim 5 wherein said magnet means is a permanent magnet in the form of a ring.

7. A magnetic/centrifugal-fluid seal according to claim 4 further comprising coolant passage means for conducting coolant fluid proximate said gap region to cool said magnetically permeable fluid.

8. A magnetic/centrifugal-fluid seal according to claim 4 further comprising an inlet port defined through one of said radially inward-facing surfaces for admitting replacement magnetically permeable fluid into said common sealing region.

9. A magnetic/centrifugal-fluid seal according to claim 8 further comprising a recirculation flow path for said magnetically permeable fluid, said flow path including said inlet port, said common sealing region, a vent passage defined through said stationary member to receive any centrifugally pressurized magnetically permeable fluid which may spill out of said common sealing region during high speed rotation of said rotating member, a storage reservoir and means for selectively recirculating said magnetically permeable fluid through said path.

10. A magnetic/centrifugal-fluid seal according to claim 9 wherein said reservoir includes sight tube means containing a portion of the liquid stored in said reservoir for indicating the level and condition of fluid in said reservoir.

11. A magnetic/centrifugal-fluid seal according to claim 8 further comprising a reservoir for said magnetically permeable fluid disposed at a height above said common sealing region, and means for selectively delivering said magnetically permeable fluid to said inlet port from said reservoir by gravity feed.

12. A sealing arrangement employing a plurality of magnetic/centrifugal-fluid seal of the type claimed in claim 1 said two fluid seals being positioned in axially adjacent locations along an axis about which rotating member is rotatable.

13. A magnetic/centrifugal-fluid seal according to claim 1 wherein said rotating member comprises a magnetically permeable rotatable ring having a central longitudinal axis about which it is rotatable, said rotatable ring having a predetermined outer diameter, wherein said stationary member includes a ring magnet and a pair of annular magnetically permeable side plates which abut said ring magnet on respective opposite axial sides of said ring magnet, said ring magnet being concentrically spaced about said rotatable ring, said side plates each being disposed concentrically about said longitudinal axis and having an inner annular surface with a diameter which is smaller than the predetermined outer diameter of said rotatable ring such that an annular magnetic gap of generally U-shape and corresponding to said common region is defined about said rotatable ring by said side plates and said ring magnet.

14. A magnetic/centrifugal-fluid seal according to claim 13 wherein said stationary member further comprises a magnetically non-permeable ring disposed concentrically between said ring magnet and said rotatable ring and axially between said plates, said non-permeable ring having an outer annular surface which abuts said ring magnet and an inner annular surface which is annularly spaced from said rotatable ring to define the bottom portion of said annular generally U-shaped gap corresponding to said common sealing region.

15. A magnetic/centrifugal-fluid seal according to claim 14 wherein the axial length of said ring magnet 14 is equal to the axial spacing between said side plates.

16. A magnetic/centrifugal-fluid seal according to claim 14 further comprising coolant passage means for conducting coolant fluid proximate said gap region to cool said magnetically permeable fluid.

17. A magnetic/centrifugal-fluid seal according to claim 14 further comprising an inlet port defined through one of said radially inward-facing surfaces for admitting replacement magnetically permeable fluid into said common sealing region, and a recirculation flow path for said magnetically permeable fluid, said flow path including said inlet port, said common sealing region, a vent passage defined through said stationary member to receive centrifugally pressurized magnetically permeable fluid which spills out of said common sealing region during high speed rotation of said rotating member, a storage reservoir and means for selectively recirculating said magnetically permeable fluid through said path.

18. A magnetic/centrifugal-fluid seal according to claim 4 further comprising an inlet port defined through one of said radially inward-facing surfaces for admitting replacement magnetically permeable fluid into said common sealing region, and a reservoir for said magnetically permeable fluid disposed at a height above said common sealing region, and means for selectively delivering said magnetically permeable fluid to said inlet port from said reservoir by gravity feed.

19. A method of hermetically sealing the space between a rotating member and a close fitting spaced-apart stationary member, said method comprising the steps of:

receiving and pooling magnetically permeable fluid in a common gap region between said members when the fluid is thrown therein during high speed rotation of said rotating member to thereby form a centrifugal hermetic seal between said members through the pooled fluid; and establishing a closed magnetic circuit through said rotatable member, said stationary member and the magnetically permeable fluid in said common gap region to form a magnetic seal between said members through the magnetically permeable fluid when said rotating member is stationary and rotating at zero and slow speeds, such that the magnetically permeable fluid remains in said common region during high, low and zero speeds of said rotating member and during transitions between said high, low and zero speeds.

20. The method according to claim 19 further comprising the step of cooling and replacing said magnetically permeable fluid in said common gap through an inlet port defined in said stationary member.

* * * * *

UNITED STATES PATENT AND TRADEMARK OFFICE
CERTIFICATE OF CORRECTION

PATENT NO. : 4,527,802
DATED : 07/09/85
INVENTOR(S) : Donald F. Wilcock & Stanley Gray It is certified that error appears in the above-identified patent and that said Letters Patent are hereby corrected as shown below:

Column 6, line 5, change "$\Delta P-(M_s)$ (H) $(10^{31\ 6})/4$ atmospheres" to

--$\Delta P=(M_s)$ (H) $(10^{-6})/4$ atmospheres--.

Signed and Sealed this

Eighth Day of October 1985

[SEAL]

Attest:

Attesting Officer

DONALD J. QUIGG

Commissioner of Patents and Trademarks—Designate